United States Patent
Dudar

(10) Patent No.: US 9,850,832 B2
(45) Date of Patent: *Dec. 26, 2017

(54) SYSTEM AND METHODS FOR PREVENTING HYDROCARBON BREAKTHROUGH EMISSIONS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/860,421

(22) Filed: Sep. 21, 2015

(65) Prior Publication Data
US 2017/0082043 A1    Mar. 23, 2017

(51) Int. Cl.
*F02D 41/00* (2006.01)
*F02D 43/00* (2006.01)
(Continued)

(52) U.S. Cl.
CPC ......... *F02D 41/0035* (2013.01); *B60W 10/06* (2013.01); *B60W 10/08* (2013.01);
(Continued)

(58) Field of Classification Search
CPC ............. F02M 25/0836; F02M 25/089; F02M 25/0809; F02M 25/0854; F02M 25/08;
(Continued)

(56) References Cited

U.S. PATENT DOCUMENTS 3,680,318 A * 8/1972 Nakajima ................ F01N 3/18
                                                    123/320
4,886,096 A * 12/1989 Reddy .............. B60K 15/03504
                                                    123/518
(Continued)

OTHER PUBLICATIONS

Dudar, A. "System and Methods for Purging Residual Exhaust and Uncombusted Fuel to an Exhaust Catalyst," U.S. Appl. No. 14/701,094, filed Apr. 30, 2015, 52 pages.
(Continued)

*Primary Examiner* — Jelani Smith
*Assistant Examiner* — Luis A Martinez Borrero
(74) *Attorney, Agent, or Firm* — James Dottavio; McCoy Russell LLP

(57) ABSTRACT

Methods and systems are provided for performing fuel vapor canister purging operations during engine off conditions. In one example, a method may include, responsive to an indication of breakthrough of vapors from a fuel vapor canister during engine-off conditions, configuring a first cylinder with both intake and exhaust valves open, opening a canister purge valve, and applying air pressure to the vapor canister such that desorbed canister vapors may be routed to an exhaust catalyst, the exhaust catalyst temperature maintained above a light off temperature. In this way, during engine-off conditions, including conditions wherein a vehicle is powered solely by battery, bleedthrough emissions may be reliably reduced by purging the vapor canister to the exhaust catalyst without requiring turning on the engine.

18 Claims, 6 Drawing Sheets

(51) Int. Cl.

| | |
|---|---|
| *F02D 41/24* | (2006.01) |
| *F02D 41/26* | (2006.01) |
| *F02D 41/02* | (2006.01) |
| *F01N 3/20* | (2006.01) |
| *F01N 3/10* | (2006.01) |
| *F01N 3/021* | (2006.01) |
| *F01L 9/04* | (2006.01) |
| *F02M 25/08* | (2006.01) |
| *B60W 20/16* | (2016.01) |
| *B60W 10/06* | (2006.01) |
| *B60W 10/08* | (2006.01) |
| *F02D 41/04* | (2006.01) |

(52) U.S. Cl.
CPC ........... *B60W 20/16* (2016.01); *F01L 9/04* (2013.01); *F01N 3/021* (2013.01); *F01N 3/101* (2013.01); *F01N 3/103* (2013.01); *F01N 3/2013* (2013.01); *F02D 41/0032* (2013.01); *F02D 41/024* (2013.01); *F02D 41/2406* (2013.01); *F02D 41/26* (2013.01); *F02M 25/0809* (2013.01); *F02D 41/0045* (2013.01); *F02D 41/042* (2013.01); *F02D 2041/001* (2013.01); *F02D 2200/0802* (2013.01); *Y10S 903/905* (2013.01); *Y10S 903/93* (2013.01)

(58) Field of Classification Search
CPC ....... F02M 2025/0881; F02M 25/0818; F02M 25/0872; F02M 35/10222; F02M 2200/247; F02M 37/0029; F02M 59/44; F02D 41/0045; F02D 2041/225; F02D 41/0042; F02D 41/222; F02D 19/0649; F02D 19/0668; F02D 2200/0406; F02D 41/0032; F02D 2200/0602; F02D 13/0207; F02D 2400/12; F02D 31/001; F01N 3/18; F01N 3/08; F01N 3/10; F01N 3/20; F01N 3/36; F01N 5/04; F01N 13/10
USPC ... 701/22, 102, 101, 103, 36, 113, 115, 104; 180/65.265, 65.275, 65.27, 65.28; 123/519, 520, 518, 521, 184.61, 294, 458, 123/464
See application file for complete search history.

(56) References Cited

U.S. PATENT DOCUMENTS

| | | | | |
|---|---|---|---|---|
| 5,397,550 A * | 3/1995 | Marino, Jr. | ............ | F01N 3/023 422/168 |
| 5,553,451 A | 9/1996 | Harada | | |
| 5,806,304 A * | 9/1998 | Price | ............ | F01N 3/2006 123/339.19 |
| 5,875,765 A * | 3/1999 | Norton | ............ | F02M 25/0854 123/516 |
| 6,237,575 B1 * | 5/2001 | Lampert | ............ | F02D 41/0042 123/516 |
| 6,293,261 B1 * | 9/2001 | Oemcke | ............ | F02M 25/0854 123/516 |
| 6,467,258 B1 * | 10/2002 | Jobson | ............ | B01D 53/9495 60/274 |
| 6,546,955 B1 * | 4/2003 | Burke | ............ | F02M 25/089 123/516 |
| 6,581,580 B2 * | 6/2003 | Trumpy | ............ | F02M 33/02 123/516 |
| 6,664,651 B1 * | 12/2003 | Kotre | ............ | B60K 6/365 180/65.245 |
| 6,763,298 B2 | 7/2004 | Boggs et al. | | |
| 7,059,306 B2 * | 6/2006 | Reddy | ............ | F02M 25/0836 123/518 |
| 7,318,425 B2 * | 1/2008 | Kano | ............ | F02D 41/0032 123/520 |
| 7,341,048 B2 * | 3/2008 | Koyama | ............ | F02D 41/0042 123/518 |
| 7,464,698 B2 * | 12/2008 | Maegawa | ............ | F02D 41/0045 123/519 |
| 7,784,449 B2 * | 8/2010 | Maly | ............ | F02M 25/0818 123/516 |
| 8,112,985 B2 * | 2/2012 | Uhrich | ............ | F01N 3/2832 60/281 |
| 8,181,631 B2 * | 5/2012 | Bohr | ............ | F02M 25/0854 123/520 |
| 8,413,640 B2 * | 4/2013 | Mair | ............ | F02M 35/10242 123/518 |
| 8,443,787 B2 * | 5/2013 | Schondorf | ............ | B60W 10/06 123/520 |
| 8,739,766 B2 | 6/2014 | Jentz et al. | | |
| 8,881,507 B2 * | 11/2014 | Yan | ............ | F01N 3/2066 60/274 |
| 9,097,216 B2 * | 8/2015 | Itoh | ............ | F02M 25/0854 |
| 9,163,571 B2 * | 10/2015 | Dudar | ............ | F02M 25/089 |
| 9,163,590 B2 * | 10/2015 | Takeishi | ............ | F02M 25/0809 |
| 9,638,144 B2 * | 5/2017 | Pursifull | ............ | F02M 25/0836 |
| 9,650,974 B2 * | 5/2017 | Dudar | ............ | F02D 41/004 |
| 9,651,002 B2 * | 5/2017 | Dudar | ............ | F02M 25/0809 |
| 9,651,003 B2 * | 5/2017 | Ulrey | ............ | F02D 41/0007 |
| 2002/0083930 A1 | 7/2002 | Robichaux | | |
| 2003/0074958 A1 * | 4/2003 | Nagasaki | ............ | F02M 25/0818 73/114.41 |
| 2005/0011185 A1 * | 1/2005 | Annoura | ............ | F02D 41/0032 60/289 |
| 2005/0194788 A1 * | 9/2005 | Kanai | ............ | F02D 41/003 290/40 B |
| 2005/0257608 A1 * | 11/2005 | Suzuki | ............ | F02M 25/0827 73/114.39 |
| 2006/0054142 A1 * | 3/2006 | Burke | ............ | F02M 25/08 123/518 |
| 2006/0225713 A1 * | 10/2006 | Kano | ............ | F02D 41/0032 123/520 |
| 2006/0283427 A1 * | 12/2006 | Koyama | ............ | F02D 41/0042 123/519 |
| 2008/0314369 A1 * | 12/2008 | Takakura | ............ | F02M 25/0827 123/520 |
| 2010/0281852 A1 * | 11/2010 | Conrad | ............ | F02D 41/029 60/274 |
| 2012/0132179 A1 * | 5/2012 | Kobayashi | ............ | F02M 25/0818 123/518 |
| 2013/0081600 A1 * | 4/2013 | Fukui | ............ | F01N 3/101 123/520 |
| 2013/0146031 A1 * | 6/2013 | Kim | ............ | F02M 25/089 123/520 |
| 2013/0228145 A1 * | 9/2013 | Moyer | ............ | F02M 33/04 123/184.21 |
| 2014/0303830 A1 * | 10/2014 | Dudar | ............ | F02M 25/0809 701/29.1 |
| 2015/0090006 A1 | 4/2015 | Peters et al. | | |
| 2015/0120108 A1 * | 4/2015 | Dudar | ............ | F02M 25/089 701/22 |
| 2015/0120110 A1 * | 4/2015 | Yang | ............ | B60K 6/20 701/22 |
| 2016/0123254 A1 * | 5/2016 | Burleigh | ............ | F02D 41/004 123/520 |
| 2016/0215711 A1 * | 7/2016 | Dudar | ............ | F02D 41/004 |
| 2016/0319718 A1 * | 11/2016 | Dudar | ............ | F02M 25/089 |
| 2017/0030271 A1 * | 2/2017 | Dudar | ............ | F02D 13/0261 |

OTHER PUBLICATIONS

Dudar, Aed M. et al., "System and Methods for Regulating Fuel Vapor Flow in a Fuel Vapor Recirculation Line," U.S. Appl. No. 14/825,067, filed Aug. 12, 2015, 61 pages.
Dudar, Aed M., "Systems and Methods for Limited Emissions Refueling," U.S. Appl. No. 15/013,720, filed Feb. 2, 2016, 40 pages.
Dudar, Aed M. et al., "Systems and Methods for Detection and Mitigation of Liquid Fuel Carryover in an Evaporative Emissions System," U.S. Appl. No. 14/795,558, filed Jul. 9, 2015, 42 pages.

(56) References Cited

OTHER PUBLICATIONS

Dudar, Aed M., "System and Methods for Purging Residual Exhaust and Uncombusted Fuel to a Fuel Vapor Canister," U.S. Appl. No. 14/810,177, filed Jul. 27, 2015, 48 pages.

Dudar, Aed M., "Systems and Methods for Detection and Mitigation of Liquid Fuel Carryover in an Evaporative Emissions System," U.S. Appl. No. 14/939,672, filed Nov. 12, 2015, 54 pages.

* cited by examiner

SYSTEM AND METHODS FOR PREVENTING HYDROCARBON BREAKTHROUGH EMISSIONS

FIELD

The present description relates generally to methods and systems for controlling a vehicle engine to reduce evaporative emissions following vehicle shutdown.

BACKGROUND/SUMMARY

Vehicle emission control systems may be configured to store refueling vapors, running-loss vapors, and diurnal emissions in a fuel vapor canister, and then purge the stored vapors during a subsequent engine operation. The stored vapors may be routed to engine intake for combustion, further improving fuel economy for the vehicle. In a typical canister purge operation, a canister purge valve coupled between the engine intake and the fuel vapor canister is opened, allowing for intake manifold vacuum to be applied to the fuel vapor canister. Fresh air may be drawn through the fuel vapor canister via an open canister vent valve. This configuration facilitates desorption of stored fuel vapors from the adsorbent material in the canister, regenerating the adsorbent material for further fuel vapor adsorption.

However, engine run time in hybrid electric vehicles (HEVs) and plug-in hybrid vehicles may be limited, and thus opportunities for purging fuel vapor from the canister may also be limited. If the vehicle is refueled, saturating the canister with fuel vapor, and then parked in a hot, sunny location prior to a purge event, the canister may desorb fuel vapors as it warms up, leading to bleed emissions. For vehicles that vent the fuel tank during a vehicle-off condition, the volatization of fuel under similar conditions may overwhelm the capacity of the fuel vapor canister. Additionally, under certain conditions, a fuel vapor canister saturated with fuel vapor may desorb fuel vapors during vehicle operation under conditions where the vehicle is being solely powered by a battery. Furthermore, limited engine run times in hybrid and plug-in hybrid vehicles may result in exhaust catalyst temperatures dropping below the light-off range for vehicles relying on exhaust heat to increase the temperature of the catalyst, thus resulting in increased exhaust emissions.

One approach for addressing these problems is described by Robichaux and Kotre in US Patent No. 20020083930 A1. Therein, a method for purging the fuel vapor canister is provided for a HEV comprising commanding the engine to come on during vehicle idle conditions so that the purging process may be executed. By controlling throttle position, sufficient intake manifold vacuum may be provided such that fuel vapor may be rapidly drawn into the engine intake. However, the inventors have herein recognized that the above approach has some issues. For example, turning on the internal combustion engine solely to perform a purge operation may reduce the operating efficiency of the HEV as a result of additional fuel being consumed in order to start the engine. Furthermore, such an approach may not be practical if exhaust heat is relied upon for providing the heat source to increase the temperature of the exhaust catalyst.

Another approach to address the above problems is described by Reddy in U.S. Pat. No. 7,059,306 B2. Therein a method and system is provided for evaporative emission control for a hybrid vehicle using activated carbon fibers. Briefly, fuel vapors from the fuel tank of a hybrid vehicle are first exposed to a quantity of activated carbon granules, and any hydrocarbon vapors not adsorbed by the activated carbon granules ("bleed emissions" or "breakthrough") are passed through a scrubber containing an activated carbon fiber material capable of adsorbing substantially all of the higher volatility hydrocarbons (e.g., butane, pentane). Implementation of the activated carbon fiber scrubber device serves to decrease emissions, however, the inventors have herein recognized that the above approach additionally has some issues. For example, addition of a scrubber element increases the cost and complexity of the evaporative emissions system, and under certain conditions the scrubber element may be overwhelmed by vapor thus resulting in increased emissions.

The inventors herein have recognized the above issues, and have developed systems and methods to at least partially address them. In one example, a method is provided, comprising, while an engine is off, adsorbing fuel tank vapors in an adsorbent, the vapors generated from a fuel tank, and in response to detecting breakthrough of the vapors from the adsorbent while the engine is off, routing the vapors from the adsorbent through the engine into a catalyst coupled to an exhaust of the engine. For example, routing the vapors from the adsorbent through the engine into a catalyst may include spinning the engine unfueled and stopping the spinning such that both intake and exhaust valves of a first cylinder are configured in an open position, opening a canister purge valve (CPV), closing a throttle, and applying air pressure to the fuel vapor canister. In this way, the fuel vapor canister may be coupled to the exhaust catalyst, and by applying pressurized air to the canister, vapors may be desorbed and routed to the exhaust catalyst while the engine is off.

As one example, a method is provided, comprising, responsive to an indication of vapor breakthrough from the adsorbent while the engine is off, determining whether the temperature of the exhaust catalyst is below a threshold temperature, and if so, electrically heating the exhaust catalyst to a predetermined temperature (e.g., 600° C.). In this way, responsive to an indication of vapor breakthrough during engine-off conditions, a purging event may be commenced when the catalyst is at or above a predetermined temperature such that desorbed vapors routed to the exhaust catalyst are efficiently oxidized, thereby reducing evaporative emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
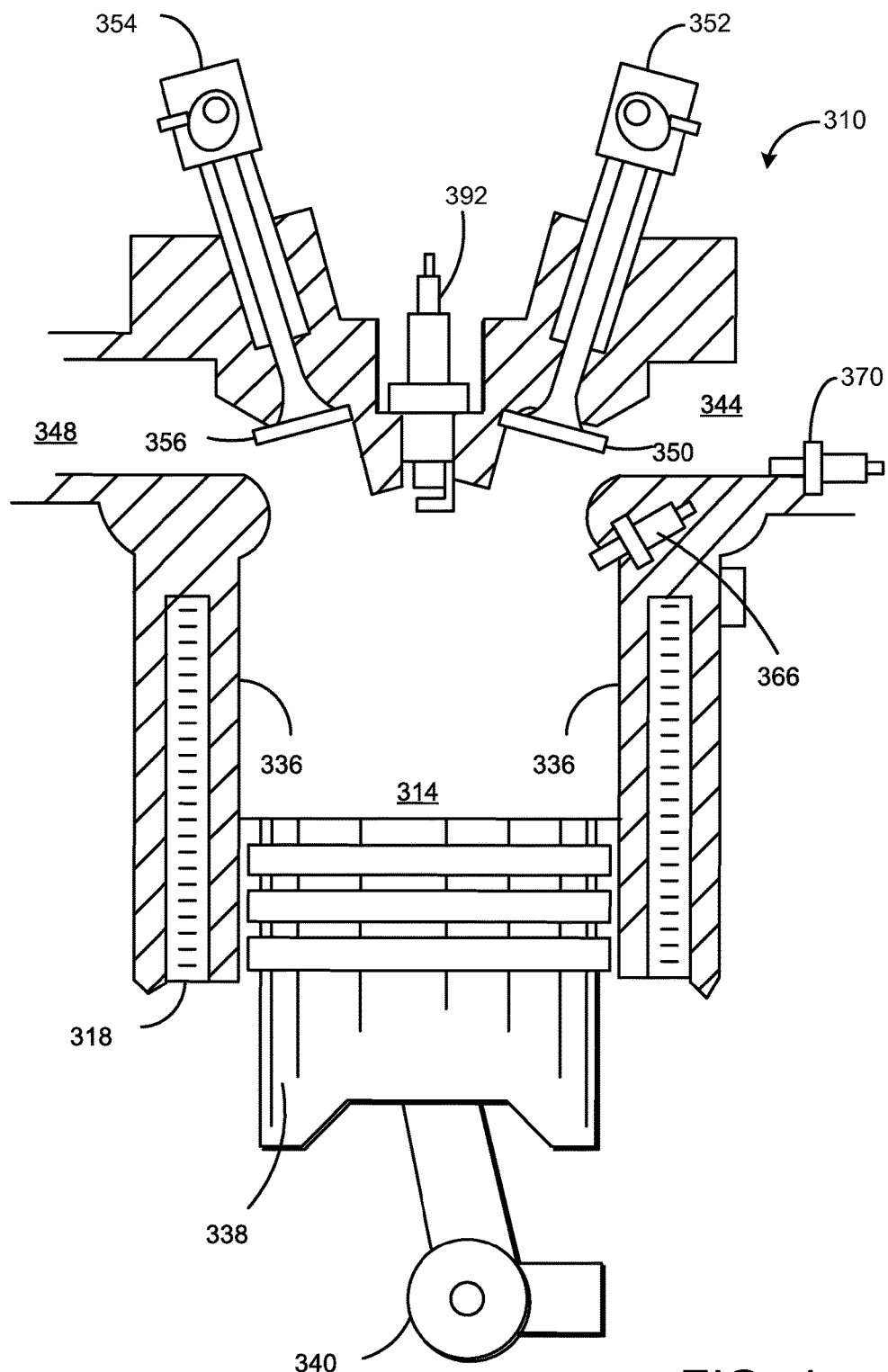
FIG. 4 schematically shows an example combustion cylinder with an open intake valve and an open exhaust valve.
Figure 5:
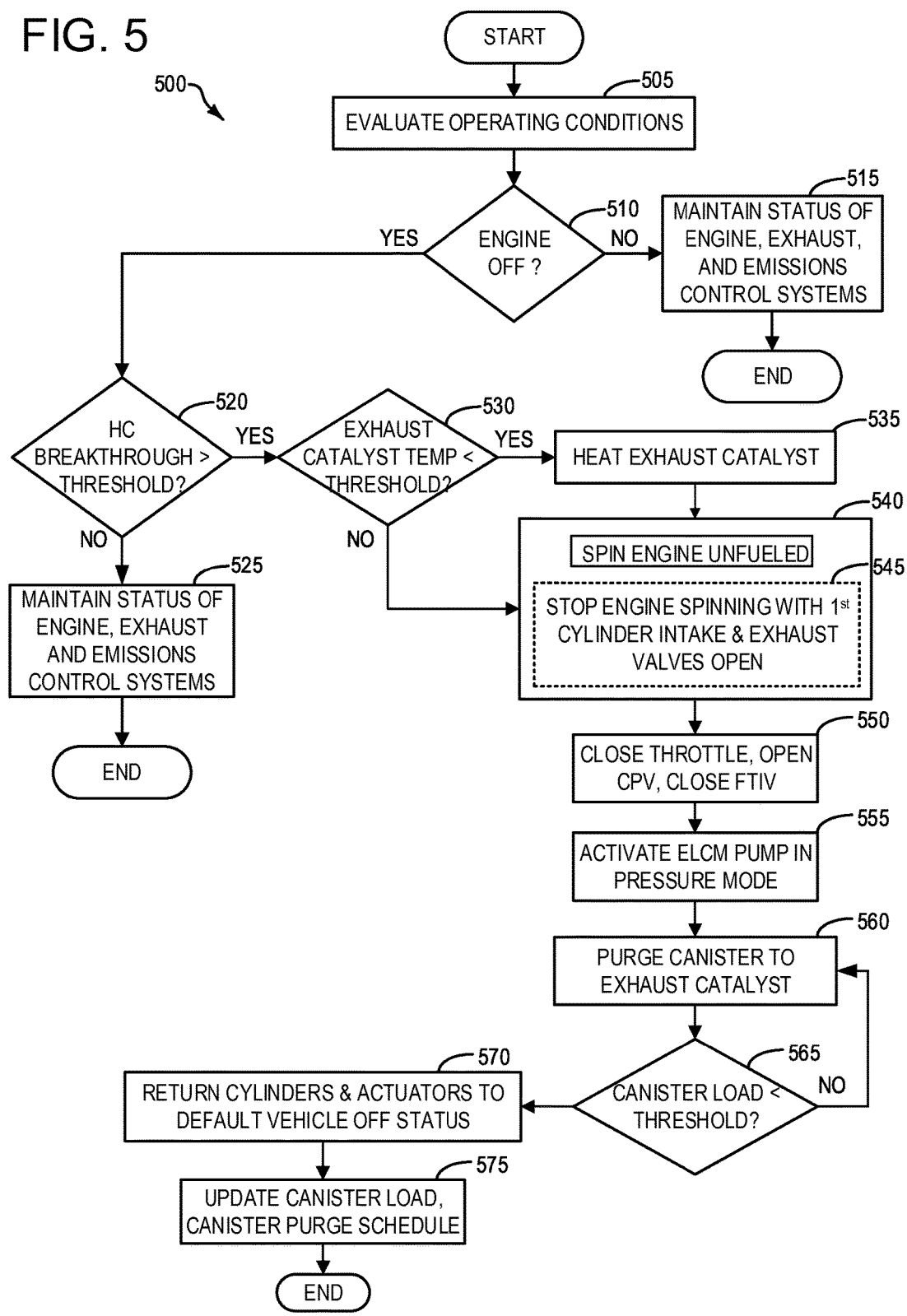
FIG. 5 shows a flowchart for a method for purging a fuel vapor canister to an exhaust catalyst during engine-off conditions upon detecting hydrocarbon breakthrough from the canister.
Figure 6:
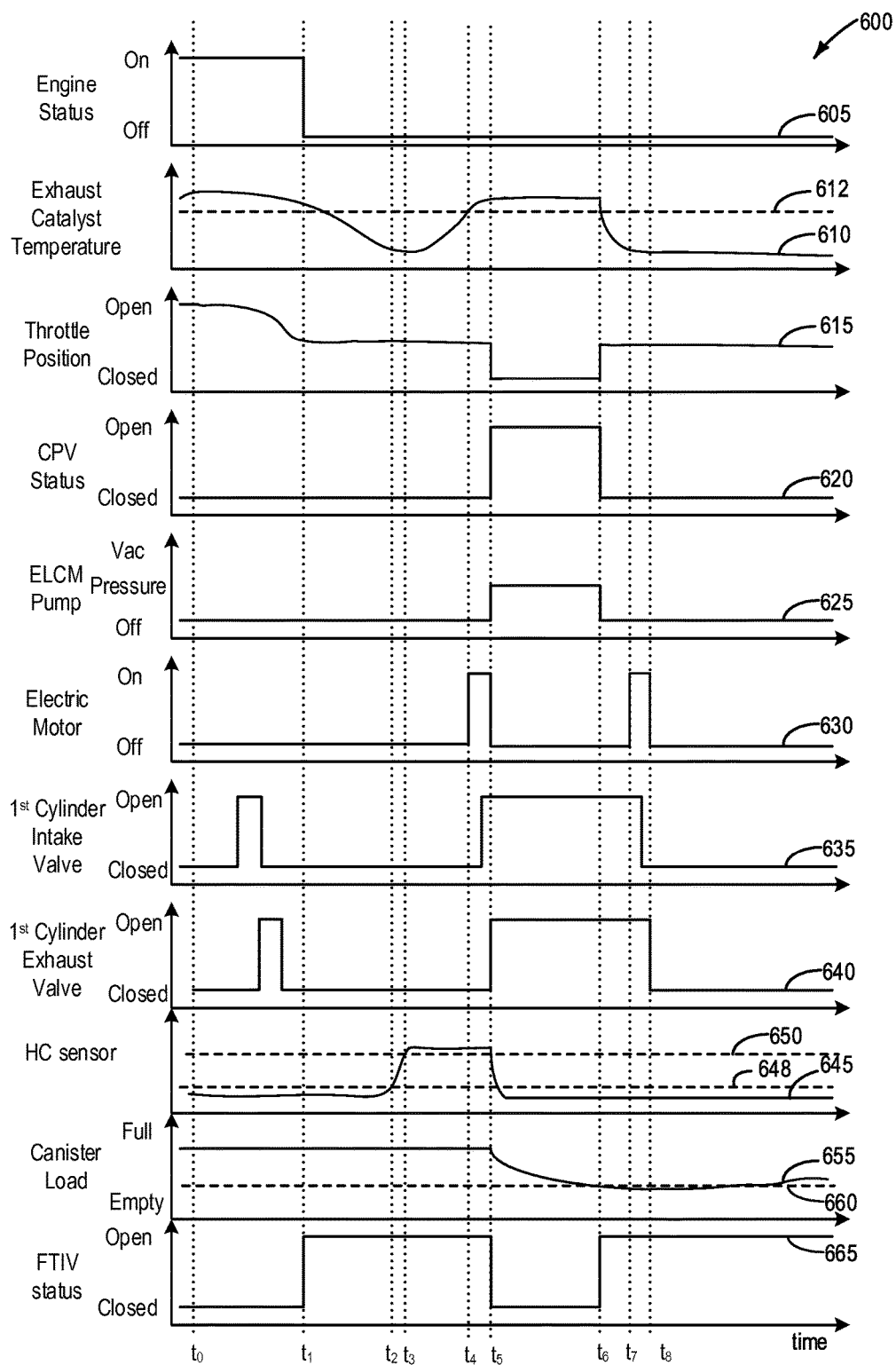
FIG. 6 shows an example timeline for fuel vapor canister purging during engine-off conditions according to the method of FIG. 5.

This detailed description relates to systems and methods for purging a fuel vapor canister to an exhaust catalyst during engine-off conditions. Specifically, the description relates to electrically heating an exhaust catalyst to a predetermined (e.g., light-off) temperature following an indication of hydrocarbon breakthrough from the fuel vapor canister during engine-off conditions, positioning a first cylinder with both intake and exhaust valves in an open conformation, commanding open a canister purge valve and closing a throttle, and applying pressurized air to the fuel vapor canister to purge the fuel vapor canister to the electrically heated exhaust catalyst. The systems and methods may be applied to a vehicle system capable of spinning an engine unfueled with an electric motor, such as the hybrid vehicle system depicted in FIG. 1. The engine may be coupled to an emissions control system and an exhaust system, as depicted in FIG. 2. The engine may comprise a plurality of combustion cylinders, such as the combustion cylinder depicted in FIG. 3. During a vehicle-off condition, the engine may be spun unfueled and stopped with both the intake valve and exhaust valve open, as shown in FIG. 4. In this conformation, the exhaust system is coupled to the intake system. As such, by opening the canister purge valve and closing a throttle, air pressure applied to the fuel vapor canister may thus promote the desorption of fuel vapor canister hydrocarbons wherein they may be routed to the electrically heated exhaust catalyst. A method for purging the fuel vapor canister in response to detection of hydrocarbon breakthrough from the fuel vapor canister during engine-off conditions is depicted in FIG. 5. A timeline for detecting and mitigating hydrocarbon breakthrough from the fuel vapor canister during engine-off conditions using the method of FIG. 5 is shown in FIG. 6.

Figure 1:
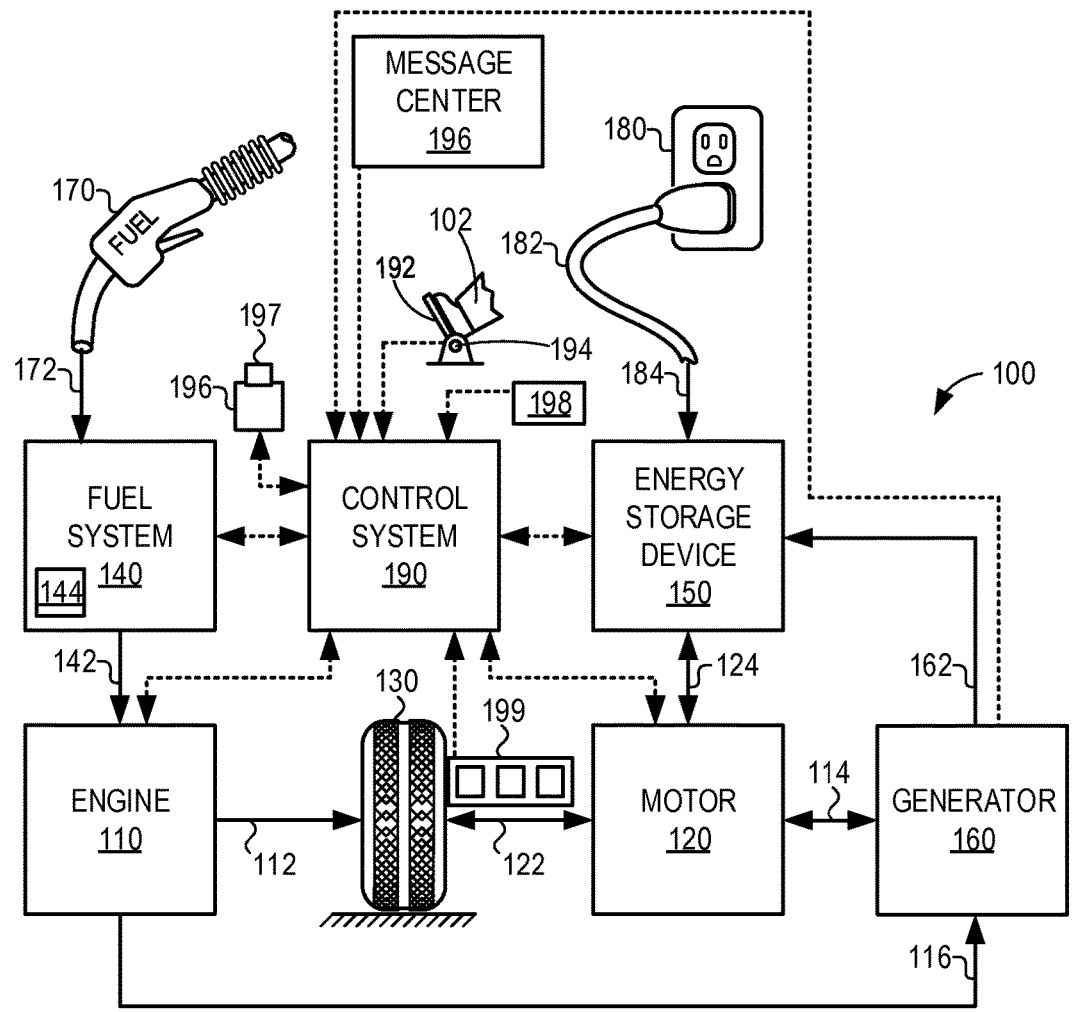
FIG. 1 schematically shows an example vehicle propulsion system.
Figure 2:
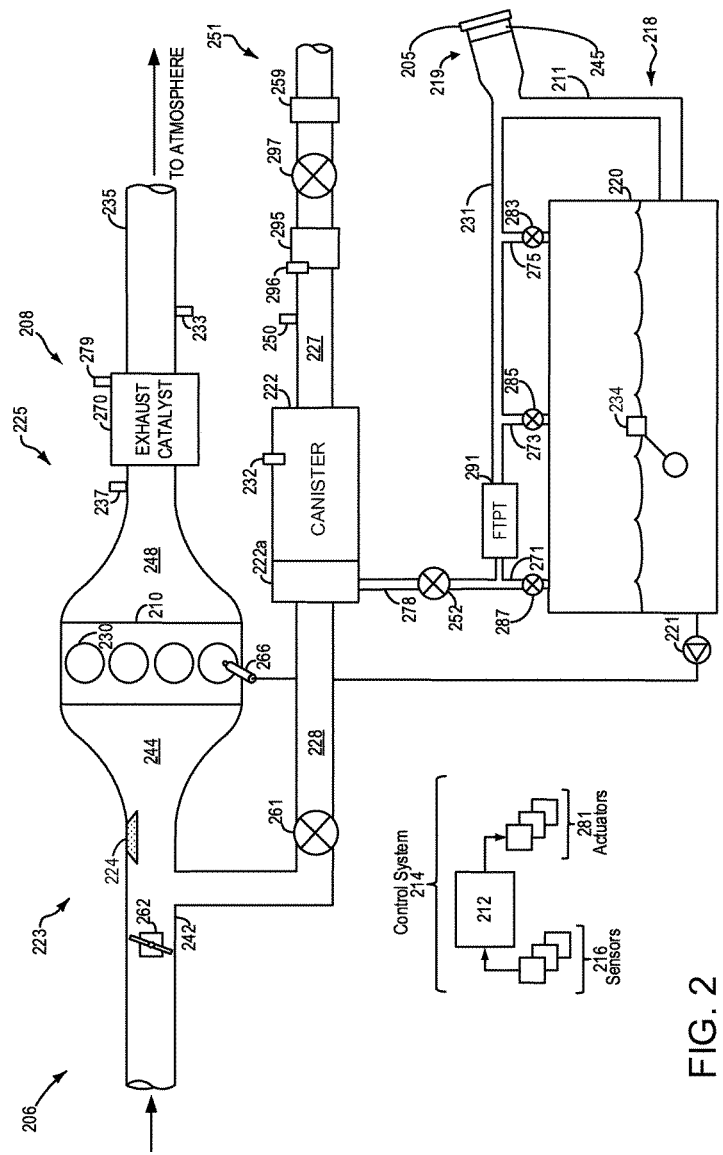
FIG. 2 schematically shows an example vehicle system with a fuel system and an evaporative emissions system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst 270, which may be mounted in a close-coupled position in the exhaust. Exhaust catalyst may include a temperature sensor 279. In some examples one or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations, "running loss" (that is, fuel vaporized during vehicle operation), and diurnal cycles. In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve (CVV) 297 coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. However, as discussed above, engine run time in HEVs and plug-in HEVs may be limited, thus reducing opportunities for conducting purging operations while the engine is on. As such, in one example, if a vehicle with a high canister load is parked in a hot, sunny location prior to purging, the canister may desorb fuel vapors leading to bleed emissions. As another example, if a vehicle is operating in battery-only mode, the inability to purge as a result of the lack of intake manifold vacuum may similarly lead to bleed emissions. Thus, there is a need for the ability to perform purging operations under engine-off conditions. As will be discussed further in detail below with reference to the method described in FIG. 5, such a method may include, responsive to detecting breakthrough of vapors from the canister while the combustion engine is not combusting, turning the combustion engine with an electric motor until the intake valve and exhaust valve of the combustion chamber are simultaneously open, and routing vapors from the adsorbent through the engine into a catalyst coupled to the exhaust valve. For example, routing vapors may include forcing air through the adsorbent in to the combustion chamber and into the catalyst in response to the breakthrough of vapors from the adsorbent into the atmosphere. In one example, such a method may include heating the catalyst in response to detecting breakthrough of the vapors from the adsorbent while the combustion engine is not combusting, wherein the heating may be performed by one or more of an electric heater, or a heat pump which transfers heat from another source (such as power inverters coupled to said electric motor or from previously stored heat). As such, under conditions wherein canister purging operations using intake manifold vacuum are not feasible or practical, engine-off purging operations may be conducted to mitigate fuel vapor canister breakthrough to the atmosphere, thus reducing evaporative emissions. Furthermore, turning the engine unfueled may additionally generate heat sufficient to cause liquid fuel within the cylinders to vaporize. As such, an engine-off purge event as described above may serve to purge any excess residual fuel contained within the cylinders to the exhaust catalyst. As one more example, purging during engine-off conditions may further result in vapors adsorbed by the AIS HC trap being desorbed and flushed to the exhaust catalyst, thus decreasing the potential for bleed emissions following completion of an engine-off purge event.

To detect breakthough, emission control system 251 may include a hydrocarbon sensor 250 positioned in the canister vent line 227 coupling the canister 222 and the atmosphere, and may provide an indication of hydrocarbon breakthrough from the canister to the atmosphere during conditions when the vehicle is off and the canister is not purging. In other examples, hydrocarbon sensor 250 may provide an indication of an ambient hydrocarbon amount in the atmosphere.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291 (fuel tank pressure transducer), and canister temperature sensor 232. Other sensors such as pressure, temperature, air/fuel ratio, and composition sensors may be coupled to various locations in the vehicle system 206. As another example, the actuators may include fuel injector 266, throttle 262, fuel tank isolation valve 252, CPV 261 and refueling lock 245. The controller 212 may receive input data from the various sensors, process the input data, and trigger the actuators in response to the processed input data based on instruction or code programmed therein corresponding to one or more routines. An example control routine is described herein with regard to FIG. 5.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode. In another example, and further described below with regard to FIGS. 5-6, an indication of hydrocarbon vapor in the canister vent line 227 greater than a predetermined amount may trigger a return to an awake mode such that a method stored in the controller may be executed.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 295 communicatively coupled to controller 212. ELCM 295 may be coupled in vent 227, between canister 222 and the atmosphere. ELCM 295 may include a vacuum pump for applying negative pressure to the fuel system when administering a leak test. In some embodiments, the vacuum pump may be configured to be reversible. In other words, the vacuum pump may be configured to apply either a negative pressure or a positive pressure on the fuel system. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, a fuel system leak may be diagnosed.

In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be a default open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

Figure 3:
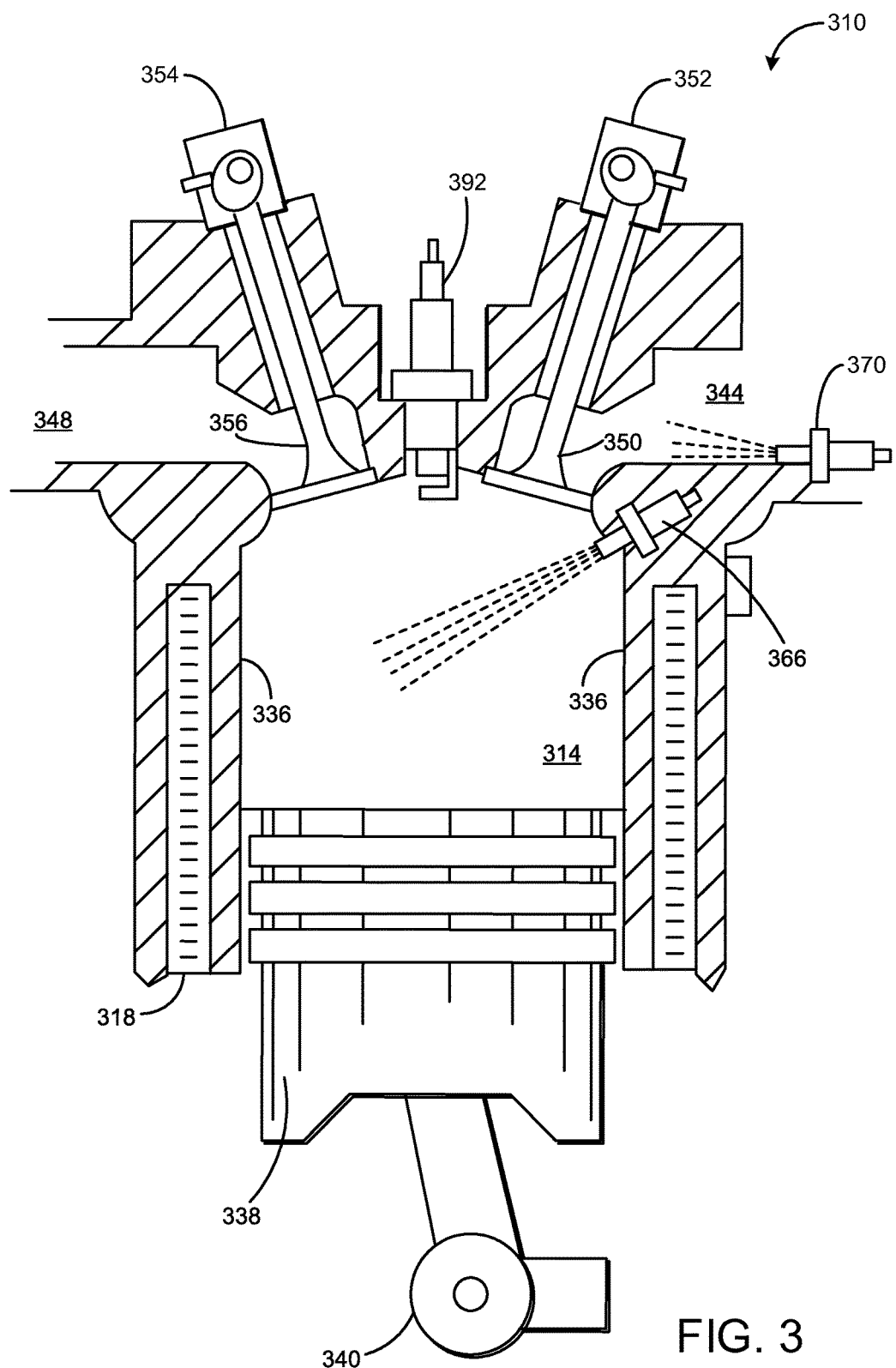
FIG. 3 schematically shows an example combustion cylinder for an engine.

FIG. 3 depicts an example embodiment of a combustion chamber or cylinder that may be included in engine 310, which may be configured similarly to engine 110 as described herein, and depicted in FIG. 1 and/or engine 210, as described herein and depicted in FIG. 2. Cylinder (i.e. combustion chamber) 314 may include combustion chamber walls 336 with piston 338 positioned therein. Piston 338 may be coupled to crankshaft 340 so that reciprocating motion of the piston is translated into rotational motion of the crankshaft. Crankshaft 340 may be coupled to at least one drive wheel of the passenger vehicle via a transmission system. Further, a starter motor may be coupled to crankshaft 340 via a flywheel to enable a starting operation of engine 310, and/or to rotate the engine in an unfueled mode.

Cylinder 314 can receive intake air via intake air passage 344, which may be one of a plurality of intake air passages coupled to cylinder 314. Intake air passage 344 may communicate with other cylinders of engine 310 in addition to cylinder 314. In some embodiments, one or more of the intake passages may include a boosting device such as a turbocharger or a supercharger. Exhaust passage 348 can receive exhaust gases from cylinder 314 as well as from other cylinders of engine 310.

Each cylinder of engine 310 may include one or more intake valves and one or more exhaust valves. For example, cylinder 314 is shown including at least one intake poppet valve 350 and at least one exhaust poppet valve 356 located at an upper region of cylinder 314. In some embodiments, each cylinder of engine 310, including cylinder 314, may include at least two intake poppet valves and at least two exhaust poppet valves located at an upper region of the cylinder.

Intake valve 350 may be controlled by a controller via actuator 352. Similarly, exhaust valve 356 may be controlled by a controller via actuator 354. During some conditions, the controller may vary the signals provided to actuators 352 and 354 to control the opening and closing of the respective intake and exhaust valves. The position of intake valve 350 and exhaust valve 356 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by a controller to vary valve operation. For example, cylinder 314 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 314 can have a compression ratio, which is the ratio of volumes when piston 338 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 310 may include a spark plug 392 for initiating combustion. An ignition system (not shown) can provide an ignition spark to cylinder 314 via spark plug 392 in response to a spark advance signal from a controller, under select operating modes. However, in some embodiments, spark plug 392 may be omitted, such as where engine 310 may initiate combustion by auto-ignition or by injection of fuel as may be the case with some diesel engines.

In some embodiments, each cylinder of engine 310 may be configured with one or more fuel injectors for providing fuel thereto. As a non-limiting example, cylinder 314 is shown including two fuel injectors 366 and 370. Fuel injector 366 is shown coupled directly to cylinder 314 for injecting fuel directly therein in proportion to a pulse width of a signal received from a controller via an electronic driver. In this manner, fuel injector 366 provides what is known as direct injection of fuel into cylinder 314. While FIG. 3 shows injector 366 as a side injector, it may also be located overhead of the piston, such as near the position of spark plug 392. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 366 from a high pressure fuel system including a fuel tank, fuel pumps, a fuel rail, etc., as depicted in FIG. 2. Alternatively, fuel may be delivered by a single stage fuel pump at lower pressure, in which case the timing of the direct fuel injection may be more limited during the compression stroke than if a high pressure fuel system is used.

Fuel injector 370 is shown arranged in intake air passage 344, rather than in cylinder 314, in a configuration that provides what is known as port injection of fuel into the intake port upstream of cylinder 314. Fuel injector 370 may inject fuel in proportion to a pulse width of a signal received from a controller via an electronic driver.

Fuel may be delivered by both injectors to the cylinder during a single cycle of the cylinder. For example, each injector may deliver a portion of a total fuel injection that is combusted in cylinder 314. Further, the distribution and/or relative amount of fuel delivered from each injector may vary with operating conditions such as described herein below. The relative distribution of the total injected fuel among injectors 366 and 370 may be referred to as a first injection ratio. For example, injecting a larger amount of the fuel for a combustion event via (port) injector 370 may be an example of a higher first ratio of port to direct injection, while injecting a larger amount of the fuel for a combustion event via (direct) injector 366 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 3 shows only one cylinder of a multi-cylinder engine. As such each cylinder may similarly include its own set of intake/exhaust valves, fuel injector(s), spark plug, etc.

Fuel injectors 366 and 370 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 370 and 366, different effects may be achieved. Fuel injectors 366 and 370 may be configured to inject fuel from the same fuel tank, from different fuel tanks, from a plurality of the same fuel tanks, or from an overlapping set of fuel tanks.

As discussed above, for HEVs and other vehicles which couple the engine drive train to an electric motor that can be powered by a battery, the engine may be turned unfueled and at a low speed using the electric motor. For vehicles that are configured with dual independent variable cam timing systems, or other means of independently controlling both the intake valve and exhaust valve, the engine may be stopped in a position where both the intake valve and the exhaust valve are open simultaneously. This conformation is shown in FIG. 4, where both intake valve 350 and exhaust valve 356 are open. In this way, exhaust passage 348 is coupled to intake air passage 344 via cylinder 314. With the CPV open, the FTIV closed, and the throttle closed, the ELCM vacuum pump may then be used to force air through the adsorbent into the intake air passage and the combustion chamber, and into the exhaust catalyst responsive to an indication of breakthrough of vapors from the adsorbent into the atmosphere while the engine is not combusting. Following an indication that canister load has decreased below a threshold, and an indication that breakthrough of vapors from the adsorbent are no longer detected, routing the vapors from the adsorbent through the engine into the catalyst may cease and the engine returned to a default position.

Turning to FIG. 5, a flow chart for an example method 500 for preventing evaporative emissions during engine-off conditions is shown. More specifically, method 500 may be used to indicate hydrocarbon breakthrough from a fuel tank vapor canister during engine-off conditions, and responsive to an indication of breakthrough above a threshold, electrically heat an exhaust catalyst such that the fuel vapor canister may be purged via an electrically operated pressure pump. In this way, method 500 enables the detection of hydrocarbon breakthrough, and purges the canister without requiring engine operation. Method 500 will be described with reference to the systems described herein and shown in FIGS. 1-4, and with reference to the methods described herein, though it should be understood that similar methods may be applied to other systems without departing from the scope of this disclosure. Method 500 may be carried out by a controller holding executable instructions in non-transitory memory, such as controller 212 in FIG. 2.

Method 500 begins at 505 and may be initiated, for example, by a HC sensor (e.g., 250 in FIG. 2) indicating an amount of hydrocarbon vapor in the canister vent line above a predetermined amount. If HC levels greater than a predetermined amount are indicated while the vehicle is off, such an indication may trigger a return to an awake mode such that method 500 may be executed. Alternatively, if the vehicle is in operation, an indication of HC levels greater than a predetermined amount in the canister vent line may enable execution of method 500 without first triggering an awake mode.

At 505, method 500 includes evaluating operating conditions. Operating conditions may be measured, estimated, or inferred. Operating conditions may include various vehicle conditions, such as vehicle speed, vehicle location, etc., various engine conditions, such as engine speed, engine load, engine status, etc., various fuel system conditions, such as fuel level, fuel tank pressure, canister load, etc., various ambient conditions, such as ambient temperature, humidity, barometric pressure, etc., and other relevant operating conditions.

Continuing at 510, method 500 includes determining whether the engine is off. An engine-off condition may be indicated by any suitable indicator, for example a key-off event. In some examples an engine-off condition may include certain vehicle-on, engine-off conditions such as those which may occur in a hybrid vehicle operating in battery-only mode. If no engine-off event has been detected, method 500 proceeds to 515. At 515, method 500 includes maintaining the status of the engine, exhaust, and emissions control systems. As one example, maintaining the status of engine, exhaust, and emissions control systems may include conducting canister purge operations under conditions wherein sufficient intake manifold vacuum is available, and may be initiated responsive to an indication of canister load above a threshold, or responsive to an indication of hydrocarbon vapor in the canister vent line, indicated by the HC sensor (e.g., 250 in FIG. 2). Method 500 may then end.

If an engine-off event is detected, method 500 proceeds to 520. At 520, method 500 includes monitoring an output of the hydrocarbon sensor. For example, during certain conditions (such as when the vehicle is parked in a hot or sunny location over a diurnal cycle, or during vehicle operation in battery-only mode), hydrocarbons may desorb from the canister and migrate to the atmosphere via the canister vent line, thereby resulting in bleed emissions or hydrocarbon breakthrough. In another example, canister 222 may be saturated and vapors from fuel tank 220 may then pass through canister 222 into the atmosphere. Thus, during engine-off conditions, if the hydrocarbon sensor (e.g., 250 in FIG. 2) output indicates a hydrocarbon amount greater than a threshold, hydrocarbon breakthrough from the canister may be inferred. At 520, monitoring the output of the hydrocarbon sensor may include monitoring the output for a predetermined duration, for example. Further, the threshold hydrocarbon amount indicated at 520 may reflect an amount greater than an amount of hydrocarbon vapor in the canister vent line sufficient to trigger an awake mode under conditions where the vehicle not in operation, or an amount of hydrocarbon vapor sufficient to enable execution of method 500 while the vehicle is in operation, as described above. If at 520, hydrocarbon breakthrough from the canister is not indicated, method 500 proceeds to 525. For example, method 500 may have been initiated due to an amount of hydrocarbon vapor in the canister vent line reflecting a level of hydrocarbon vapor in the atmosphere, wherein subsequent monitoring of hydrocarbon vapor in the canister vent line did not indicate the presence of hydrocarbon vapor resulting from canister breakthrough. As such, at 525, method 500 includes maintaining the status of the engine, exhaust, and emissions control systems. In one example, if the controller was triggered to the awake mode by the indication of hydrocarbon vapor in the canister vent line, yet breakthrough was not detected at 520, the controller may resume sleep mode. Method 500 may then end.

Returning to 520, if hydrocarbon breakthrough above a threshold is indicated, method 500 proceeds to 530 where it is determined whether the exhaust catalyst temperature is lower than a threshold temperature. For example, the threshold may be based on a temperature indicative of a catalyst activation temperature (e.g., light-off temperature). In some examples, the threshold may be further based on ambient conditions, and/or other conditions that may cause the catalyst temperature to decrease below the catalyst activation temperature within a duration of the engine-off event. The exhaust catalyst temperature may be measured via a dedicated exhaust catalyst temperature sensor (e.g., 279 in FIG. 2), or estimated or inferred based on operating conditions, such as engine coolant temperature, and/or engine conditions during the most recent drive cycle preceding the vehicle-off event. Additionally, estimating and or inferring catalyst temperature may be further based on the duration of time elapsed subsequent to the engine-off event.

If it is determined that the exhaust catalyst temperature is lower than a threshold temperature at 530, method 500 proceeds to 535. At 535 the method includes heating the exhaust catalyst. For example heating the exhaust catalyst at 535 may be performed via an electric heater. In other examples, heating the exhaust catalyst may include a heat pump which transfers heat from another source, such as power inverters coupled to the electric motor or from previously stored heat. In examples where the exhaust catalyst includes a cooling subsystem configured to reduce the exhaust catalyst temperature following the vehicle-off condition, such as an engine coolant circuit, thermoelectric cooler, etc., the cooling subsystem may be maintained off.

Upon the exhaust catalyst reaching a predetermined temperature (e.g., 600° C.), method 500 proceeds to 540. Alternatively, if at 530 the exhaust catalyst temperature is not less than a predetermined temperature, method 500 may proceed directly to 540. At 540, method 500 includes turning (spinning) the engine unfueled. More specifically, an electric motor, such as a starter motor may be operated to turn the engine. The controller may be configured to disable spark and fuel injection. The throttle may be placed or maintained in a partially open position to prevent an intake vacuum from developing. The engine may be turned unfueled for a predetermined duration, or for a duration based on current operating conditions. For example, the engine may be turned unfueled until it reaches a pre-determined temperature, such as a temperature where liquid fuel trapped within an engine cylinder is likely to be vaporized. The engine may be turned at a relatively low speed, for example at idling speed or lower, but may be spun at a higher speed if more heat generation is necessary (e.g., ambient temperatures are below a threshold). By attaining a pre-determined engine temperature, any excess fuel puddled in the intake manifold, or in the combustion chambers may be vaporized and thus routed to the hot catalyst during the purge operation, described in further detail below. At 545, method 500 includes stopping the engine turning in a position where a first cylinder (combustion chamber) intake valve and exhaust valve are open. For example, FIG. 4 shows cylinder 314 in a position with valves 350 and 356 opened. Engines with mechanically activated valves may require the engine to be stopped in a specific position to open the intake and exhaust valves for the first cylinder, whereas in other examples engines with electrically activated valves may be able to open an intake and exhaust valve from a plurality of engine positions. In some examples, more than one cylinder may be positioned with open intake and exhaust valves. The first cylinder or cylinders may be preselected, or may be selected based on operating conditions. For example, for variable displacement engines, if an engine cylinder was deactivated during a previous drive cycle, that cylinder may not be selected as the first cylinder to be purged. In another example, the cylinder closest to the catalyst may be selected.

Continuing at 550, method 500 includes closing the throttle, commanding open the CPV, and closing the FTIV. Commanding the throttle and FTIV closed while the CPV is opened and the first cylinder is positioned with both intake and exhaust valves in an open position thus couples atmosphere to engine intake/exhaust via the purge line, for example purge line 228 in FIG. 2, and the vent line, for example vent line 227 in FIG. 2. As such, to direct air flow through the canister, method 500 includes turning on the ELCM pump, for example ELCM pump 295 in FIG. 2, in pressure mode. With the ELCM pump activated, fresh air may be forced to the fuel vapor canister via the vent line 227 wherein hydrocarbons adsorbed in the fuel vapor canister may be desorbed, and routed to the hot exhaust catalyst via the purge line 228. As such, at 560, method 500 includes purging the fuel tank vapor canister to the exhaust catalyst. The purge event may be maintained for a predetermined duration, or a duration based on current operating conditions. As described above, purging the canister to the exhaust catalyst while the engine is off and responsive to an indication of hydrocarbon concentration in the canister vent line above a threshold may further serve to purge trapped vapors in the combustion chambers and hydrocarbons adsorbed in the AIS HC trap in the intake manifold to the exhaust catalyst. At 565 method 500 includes determining whether canister load is below a predetermined threshold. For example, a canister temperature sensor (e.g., canister temperature sensor 232 in FIG. 2) may be used to determine hydrocarbon desorption within the canister. A temperature plateau may indicate that hydrocarbons are no longer being desorbed. In another example, a second hydrocarbon sensor (not shown) may be positioned downstream of the canister such that the purge event may be monitored, and ended upon indication of hydrocarbon vapor below a threshold. If at 565, canister load is not below a threshold, method 500 includes continuing fuel vapor canister purging until canister load reaches the threshold. When it is indicated that canister load is below the threshold at 565, and breakthrough of vapors from the canister adsorbent is no longer detected, method 500 proceeds to 570. At 570, method 500 includes returning the engine to a default conformation. For example, returning the engine to a default conformation at 570 includes commanding open the FTIV, commanding the throttle to a default engine-off position, closing the CPV, and turning off the ELCM pump. Further, returning the engine to a default conformation at 570 may include operating the electric motor to spin the engine unfueled, and stopping the engine spinning in a position where the first cylinder intake valve and exhaust valve are closed. As described above, operating the starter motor to spin the engine unfueled may include disabling spark and fuel injection.

Following returning the engine to a default conformation at 570, method 500 proceeds to 575. At 575, method 500 includes updating a canister load, and updating a canister purge schedule to reflect the completed engine-off fuel vapor canister purge event. For example, the controller may update the canister load to reflect the quantity of hydrocarbons desorbed during the purging operation, and the canister purge schedule may be updated based on the updated canister load. As described above, if the controller was triggered to the awake mode by the indication of hydrocarbon vapor in the canister vent line, prior to purging the canister, the controller may resume sleep mode. Method 500 may then end.

FIG. 6 shows an example timeline 600 for purging a vapor canister upon detection of hydrocarbon breakthrough from the canister during engine-off conditions according to the methods described herein and with reference to FIG. 5, and as applied to the systems described herein and with reference to FIGS. 1-4. Timeline 600 includes plot 605, indicating an engine status over time, and plot 610, indicating an exhaust catalyst temperature over time. Line 612 indicates a light-off temperature for the exhaust catalyst. Timeline 600 further includes plot 615, indicating a throttle position over time, plot 620, indicating a CPV status over time, plot 625, indicating the status of an ELCM pump over time, and plot 630, indicating the status of an electric motor configured to rotate the engine over time. Timeline 600 further includes plot 635, indicating the status of a first engine cylinder intake valve over time, and plot 640, indicating the status of a first engine cylinder exhaust valve over time. Timeline 600 further includes lot 645, indicating the output of a hydrocarbon sensor over time. Line 648 indicates a predetermined amount of hydrocarbon in the canister vent line sufficient to trigger the execution of the method described in detail in FIG. 5. Line 650 indicates a threshold hydrocarbon sensor output indicating hydrocarbon breakthrough from the vapor canister above a predetermined level. Timeline 600 further includes plot 655 indicating a fuel vapor canister load over time. Line 660 indicates a threshold fuel vapor canister load wherein a purge operation may be ended. Timeline 600 further includes plot 665, indicating the status of a FTIV over time.

At time $t_0$, the engine is on, as indicated by plot 605. As indicated by plot 610, the exhaust catalyst temperature is above the light-off temperature represented by line 612. The throttle is open, as indicated by plot 615, the CPV is closed, as indicated by plot 620, the ELCM pump is off, as indicated by plot 625, the electric motor is off, as indicated by plot 630, and the FTIV is closed, as indicated by plot 665. The fuel vapor canister is loaded with fuel tank vapor, as indicated by plot 655, yet hydrocarbon breakthrough is not detected, as indicated by the output of hydrocarbon sensor represented by plot 645.

The engine is maintained on from time $t_0$ to time $t_1$. Accordingly, the intake and exhaust valves for the $1^{st}$ cylinder are opened and closed based on engine rotation and combustion, as shown by plots 635 and 640, respectively. The throttle is gradually shifted from a wide-open position towards a more closed position as the vehicle approaches an engine-off condition, where an engine-off condition may include a transition to battery-only mode, or a vehicle ceasing operation. Canister load does not appreciably change, indicated by plot 655, the result of the FTIV being maintained closed, as indicated by plot 665.

At time $t_1$, the engine is turned off. Upon engine shutdown, FTIV is opened such that fuel tank vapors may travel from the fuel tank to be adsorbed in the fuel vapor canister. Between time $t_1$ and $t_2$, exhaust catalyst temperature gradually decreases. As the fuel vapor canister is loaded with fuel vapors and the FTIV is open, vaporized hydrocarbons may break through the canister over time. At time $t_2$ the level of hydrocarbon in the vent line reaches a predetermined amount such that the method described in detail in FIG. 5 may be initiated. The level of hydrocarbon vapor in the canister vent line continues to rise between time $t_2$ and $t_3$, and at time $t_3$ the level of hydrocarbon indicated by the hydrocarbon sensor crosses a threshold. As the temperature of the exhaust catalyst is below the light-off temperature, and the engine is off, the exhaust catalyst is heated electrically. In another example, the exhaust catalyst may be heated via a heat pump, as described above. Between time $t_3$ and $t_4$ the temperature of the exhaust catalyst rises, reaching the threshold light-off temperature at time $t_4$.

Following indication that the light-off temperature for the exhaust catalyst has been reached at $t_4$, the electric motor is turned on and between time $t_4$ and $t_5$ the engine is turned unfueled such that the $1^{st}$ cylinder is positioned with both intake and exhaust valves open. At time $t_5$, following positioning of the $1^{st}$ cylinder intake and exhaust valves in an open conformation, the throttle, as indicated by plot 615, and the FTIV, as indicated by plot 665, are commanded closed. In addition, the CPV, as indicated by plot 620, is commanded open and the ELCM pump is activated in pressure mode. With the ELCM pump functioning in pressure mode with the CPV open, the throttle and FTIV closed, and the $1^{st}$ cylinder configured with both intake and exhaust valves open, the vapor canister is purged to the exhaust catalyst where in one example the hydrocarbon and CO vapors may be oxidized, the exhaust catalyst maintained above the light-off temperature threshold. Accordingly, between time $t_5$ and $t_6$, as the ELCM pump is directing ambient air in the direction of the vapor canister, the level of hydrocarbon in the vent line rapidly declines, as indicated by plot 645, and hydrocarbons are desorbed from the fuel vapor canister, thus decreasing fuel vapor canister load, indicated by plot 655.

At time $t_6$ fuel vapor canister load crosses a threshold, indicated by line 660. As such, the throttle may be commanded to a default position, indicated by plot 615. Additionally, the CPV may be commanded closed, the FTIV may be commanded open, and the ELCM pump may be turned off. Furthermore, electrical heating of the exhaust catalyst may be discontinued. As the engine is off and heat is no longer supplied to the exhaust catalyst, temperature of the exhaust catalyst begins to drop. At time $t_7$ the electric motor is turned on and between time $t_7$ and $t_8$ the engine is spun unfueled such that the $1^{st}$ cylinder is positioned with both intake and exhaust valves closed. Thus at time $t_8$, the engine-off canister purge event is complete and the engine is returned to default conformation.

In this way, responsive to an indication of hydrocarbon breakthrough in the canister vent line during engine-off conditions, a purging event may be conducted such that hydrocarbon breakthrough is mitigated, and the vapor canister is sufficiently purged to the exhaust catalyst. Furthermore, desorbed vapors from the AIS HC trap and residual fuel vapor in the engine cylinders may be routed to the exhaust catalyst. By purging without turning on the engine, problems associated with approaches wherein the engine is commanded to come on such that the purging process may be executed may be avoided, such as reduced operating efficiency and a reliance on exhaust heat to provide the heat source to increase the temperature of the exhaust catalyst. Further, enabling purging while the engine is off eliminates a need for additional scrubber elements designed to capture bleed emissions, which may increase the cost and complexity of the evaporative emissions system and which may not always function optimally under various operating conditions.

The technical effect of conducting a purge event under engine-off conditions using the method described herein is to enable the execution of the purge event under conditions where the engine is off and the exhaust catalyst is below a threshold (e.g., light off) temperature. By heating the exhaust catalyst via an electric heater, or a heat pump which transfers heat from another source, in response to an indication of hydrocarbon breakthrough from the vapor canister, the engine-off purge operation may be conducted under conditions such as a long soak in a hot, sunny location, or during conditions where a vehicle is being operated in battery-mode where the exhaust catalyst is below a threshold temperature. In this way, evaporative emissions may be reliably prevented during conditions where intake manifold vacuum is not available for mitigating vapor breakthrough to the atmosphere.

The systems described herein and with reference to FIGS. 1-4, along with the methods described herein and with reference to FIG. 5 may enable one or more systems and one or more methods. In one example, a method comprises while an engine is off, adsorbing fuel vapors in an adsorbent, said vapors are generated in a fuel tank coupled to said engine; and in response to detecting breakthrough of said vapors from said adsorbent while said engine is off: routing vapors from said adsorbent through said engine into a catalyst coupled to an exhaust of said engine. In a first example of the method, the method includes turning said engine until an intake valve and an exhaust valve of a cylinder of said engine are simultaneously open while said engine is not combusting and in response to breakthrough of said vapors from said canister into the atmosphere. A second example of the method optionally includes the first example and further comprises electrically heating said catalyst in response to detecting breakthrough of said vapors from said adsorbent while said engine is off. A third example of the method optionally includes one or more of the first and second examples and further comprises forcing air through said adsorbent into said cylinder and into said catalyst in response to said breakthrough of said vapors from said adsorbent into the atmosphere and while said engine is off. A fourth example of the method optionally includes any one or more or each of the first through third examples and further includes wherein said routing of said vapors into said catalyst commences when said catalyst is at or above a predetermined temperature. A fifth example of the method optionally includes any one or more or each of the first through fourth examples and further includes wherein said adsorbent is housed in a canister that is vented to atmosphere through a valve. A sixth example of the method optionally includes any one or more or each of the first through fifth examples and further comprises coupling a pump to said vent valve and activating said pump to force said vapors from said canister through said engine into said catalyst. A seventh example of the method optionally includes any one or more or each of the first through sixth examples and further comprises reversing direction of said pump to perform a leak diagnostic test on said canister.

Another example of a method comprises propelling a motor vehicle by either a combustion engine or an electric motor; supplying fuel to said combustion engine from a fuel tank which in turn is coupled to an adsorbent that adsorbs fuel vapors generated in said tank; and in response to detecting breakthrough of said vapors from said adsorbent while said combustion engine is not combusting: turning said combustion engine with said electric motor until an intake valve and an exhaust valve of a cylinder of said combustion engine are simultaneously open; and routing vapors from said adsorbent through said engine into a catalyst coupled to said exhaust valve. In a first example of the method, the method further comprises heating said catalyst in response to detecting breakthrough of said vapors from said adsorbent while said combustion engine is not combusting. A second example of the method optionally includes the first example and further includes wherein said heating is performed by one or more of the following: an electric heater; or a heat pump which transfers heat from another source such as power inverters coupled to said electric motor or from previously stored heat. A third example of the method optionally includes one or more of the first and second examples and further comprises oxidizing HC (hydrocarbon) and CO (carbon monoxide) from said vapors by said catalyst. A fourth example of the method optionally includes one or more or each of the first through third examples and further comprises turning said combustion engine to a default position when said breakthrough is no longer detected. A fifth example of the method optionally includes one or more or each of the first through fourth examples and further comprises forcing air through said adsorbent into said cylinder and into said catalyst in response to said breakthrough of said vapors from said adsorbent into the atmosphere and while said combustion engine is not combusting off.

An example of a system for a vehicle comprises a combustion engine comprising one or more cylinders, each cylinder comprising an intake valve and an exhaust valve; an exhaust catalyst coupled to a combustion engine exhaust; a fuel vapor canister comprising an adsorbent for adsorbing fuel vapors coupled to an engine intake via a canister purge valve and to atmosphere via a canister vent valve; a fuel tank coupled to said fuel vapor canister via a fuel tank isolation valve; a throttle coupled between said engine intake and atmosphere; an air pump coupled between sad fuel vapor canister and said atmosphere; a hydrocarbon sensor coupled between said fuel vapor canister and said atmosphere; and a controller configured with instructions stored in non-transitory memory, that when executed cause the controller to: in response to detecting breakthrough of adsorbed fuel vapors from said fuel vapor canister while said engine is off; heat said exhaust catalyst; position a first engine cylinder with an intake valve open and an exhaust valve open; close said throttle; open said canister purge valve; close said fuel tank isolation valve; turn said air pump on; and force air through said adsorbent into said cylinder and to said exhaust catalyst. In a first example, the system further comprises an air intake system hydrocarbon trap, and wherein forcing air through said adsorbent into said cylinder and to said exhaust catalyst includes forcing air through said air intake system hydrocarbon trap. A second example of the system optionally includes the first example and further includes wherein said air pump is a reversible air pump housed within an evaporative leak check module. A third example of the system optionally includes one or more of the first and second examples and further comprises an electric motor coupled to said engine; and wherein positioning said first engine cylinder with an intake valve open and an exhaust valve open includes turning said engine with said electric motor until said intake valve and said exhaust valve of said cylinder of said engine are simultaneously open. A fourth example of the system optionally includes one or more or each of the first through third examples and further includes wherein forcing air through said adsorbent into said cylinder and to said exhaust catalyst includes desorbing vapors from said adsorbent, said desorbing of vapors resulting in a temperature change indicated by a temperature sensor; and wherein said controller is further configured with instructions stored in non-transitory memory, that when executed cause the controller to: responsive to a temperature change plateau during forcing air through said adsorbent; turning said combustion engine to a default position. A fifth example of the system optionally includes one or more or each of the first through fourth examples and further includes wherein heating said catalyst includes performing the heating by one or more of an electric heater, or a heat pump capable of transferring heat from another source.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   while an engine is off, adsorbing fuel vapors in an adsorbent, said vapors generated in a fuel tank coupled to said engine; and
   responsive to detecting breakthrough of said vapors from said adsorbent while said engine is off: activating a pump to force air through said adsorbent, into said engine, then into an exhaust catalyst of said engine, to route vapors from said adsorbent through said engine and then into said catalyst.

2. The method recited in claim 1, further comprising turning said engine until an intake valve and an exhaust valve of a cylinder of said engine are simultaneously open while said engine is not combusting and in response to breakthrough of said vapors from said adsorbent into the atmosphere.

3. The method recited in claim 1, further comprising electrically heating said catalyst in response to detecting breakthrough of said vapors from said adsorbent while said engine is off.

4. The method recited in claim 1, wherein said routing of said vapors into said catalyst commences when said catalyst is at or above a predetermined temperature.

5. The method recited in claim 1, wherein said adsorbent is housed in a canister that is vented to atmosphere through a valve.

6. The method recited in claim 1, wherein said pump is coupled to a vent valve.

7. The method recited in claim 6, further comprising reversing a direction of said pump to perform a leak diagnostic test on a canister.

8. A method comprising:
propelling a motor vehicle by either a combustion engine or an electric motor;
supplying fuel to said combustion engine from a fuel tank which in turn is coupled to an adsorbent that adsorbs fuel vapors generated in said tank; and
in response to detecting breakthrough of said vapors from said adsorbent while said combustion engine is not combusting: turning said combustion engine with said electric motor until an intake valve and an exhaust valve of a cylinder of said combustion engine are simultaneously open; and forcing air through said adsorbent, into said engine, and then into a catalyst coupled to said exhaust valve, to route vapors from said adsorbent through said engine and then into said catalyst.

9. The method recited in claim 8, further comprising heating said catalyst in response to detecting breakthrough of said vapors from said adsorbent while said combustion engine is not combusting.

10. The method recited in claim 9, wherein said heating is performed by one or more of an electric heater or a heat pump which transfers heat from another source such as power inverters coupled to said electric motor or from previously stored heat.

11. The method recited in claim 8, further comprising oxidizing HC (hydrocarbon) and CO (carbon monoxide) from said vapors by said catalyst.

12. The method recited in claim 8, further comprising turning said combustion engine to a default position when said breakthrough is no longer detected.

13. A system for a vehicle comprising:
a combustion engine comprising one or more cylinders, each cylinder comprising an intake valve and an exhaust valve;
an exhaust catalyst coupled to a combustion engine exhaust;
a fuel vapor canister comprising an adsorbent for adsorbing fuel vapors coupled to an engine intake via a canister purge valve and to atmosphere via a canister vent valve;
a fuel tank coupled to said fuel vapor canister via a fuel tank isolation valve;
a throttle coupled between said engine intake and atmosphere;
an air pump coupled between said fuel vapor canister and said atmosphere;
a hydrocarbon sensor coupled between said fuel vapor canister and said atmosphere; and
a controller configured with instructions stored in non-transitory memory, that when executed cause the controller to:
in response to detecting breakthrough of adsorbed fuel vapors from said fuel vapor canister while said engine is off:
heat said exhaust catalyst;
position a first engine cylinder with an intake valve open and an exhaust valve open;
close said throttle;
open said canister purge valve;
close said fuel tank isolation valve;
turn said air pump on; and
operate said air pump to force air through said adsorbent, into said cylinder, and then into said exhaust catalyst, to route vapors from said adsorbent through said cylinder and then into said exhaust catalyst.

14. The system of claim 13, further comprising:
an air intake system hydrocarbon trap, and wherein forcing air through said adsorbent into said cylinder and to said exhaust catalyst includes forcing air through said air intake system hydrocarbon trap.

15. The system of claim 13, wherein said air pump is a reversible air pump housed within an evaporative leak check module.

16. The system of claim 13, further comprising:
an electric motor coupled to said engine; and wherein positioning said first engine cylinder with an intake valve open and an exhaust valve open includes turning said engine with said electric motor until said intake valve and said exhaust valve of said cylinder of said engine are simultaneously open.

17. The system of claim 13, wherein forcing air through said adsorbent into said cylinder and to said exhaust catalyst includes desorbing vapors from said adsorbent, said desorbing of vapors resulting in a temperature change indicated by a temperature sensor; and
wherein said controller is further configured with instructions stored in non-transitory memory, that when executed cause the controller to:
responsive to a temperature change plateau during forcing air through said adsorbent:
turning said combustion engine to a default position.

18. The system of claim 13, wherein heating said catalyst includes performing the heating by one or more of an electric heater or a heat pump capable of transferring heat from another source.

* * * * *